Patented Dec. 26, 1933

1,941,059

UNITED STATES PATENT OFFICE 1,941,059

TREATMENT OF FILLING AND REENFORCING MATERIALS USED IN PLASTIC COMPOSITIONS

Alfred Raymond Steele, Crumpsall, Manchester, and Alexander Stewart, Prestwich, Manchester, England, assignors to Imperial Chemical Industries Limited, a corporation of Great Britain No Drawing. Application February 13, 1931, Serial No. 515,646, and in Great Britain February 14, 1930

2 Claims. (Cl. 106—22)

This invention relates to improvements in the process of manufacturing filling and reenforcing materials for use in plastic compositions such as are used in the production of moulded articles.

Moulding compositions are prepared by incorporating a filling or reenforcing material such as a finely divided wood, for example wood flour, wood meal, sawdust, and the like, metal filings, asbestos, paper pulp and other materials into synthetic resinous products such as are prepared for example, by condensation processes from a phenol and an aldehyde, other materials being added as desired in order to modify the behaviour of the moulding composition during moulding.

When wood in the form of wood flour, wood meal, sawdust and the like is used as a filler the physical properties of the moulding composition have been found to depend, inter alia, on the type of mixing machine employed and on the amount of water present in the mixture. Thus a material which may be kneaded easily at a comparatively low temperature, such as is desirable when a thermal hardening composition is being prepared, needs often to have a quantity of water or other liquid present, but the presence of water sometimes causes the bulk density of the moulding composition to be lower than is desirable. Further, products which have an undesirably low bulk density are also sometimes obtained even when the amount of water present in the mixing is not particularly high, and this appears to depend on the manner, or even on the particular machine, in which the kneading is carried out.

According to the present invention we obtain moulding compositions of improved bulk density by mixing an artificial resinous product with woody matter, for example, wood meal, subjected to treatment with an alkaline or other caustic solution.

In carrying our invention into practical effect we incorporate with, for example a condensation product of a phenol and an aldehyde, a wood meal treated preferably with a simple alkaline solution such as that of caustic soda, but we do not restrict ourselves to the use of a caustic alkali, since other agents such as the peroxides, hydroxides, sulphides, sulphites, hypochlorites, and bisulphites, of the alkali and alkaline earth metals, or mixtures of two or more of these materials, are also suitable, as well as ammoniacal solution of hydrated oxide of copper.

For the purpose of our invention we may use solutions of widely differing concentrations, and do not limit ourselves to any particular temperature, since the conditions used will be determined by the nature of and extent to which it is required to modify the woody material under treatment.

In the further treatment of the woody matter according to our invention we find that we may remove the solution of agents directly either e. g. by filtration and washing or by adding such a reagent as will return the wood to a neutral condition. Thus, in the case of a wood meal treated with an alkaline solution, it is not necessary in many cases to remove the excess of alkaline solution, we may neutralize it by adding acid. With other agents such as may be used in carrying out our invention, an appropriate killing agent may similarly be added. After such neutralization the salts present may, or may not, be washed out of the wood before it is incorporated with the resinous composition.

The following example is given to illustrate the methods of operation, but we do not limit ourselves to the example given. The parts are by weight.

Example 36 parts of wood meal having a moisture content of approximately 11%, are treated with 15 parts of caustic soda liquor of 70° TW., and an equal weight of water, by mixing in a suitable kneading machine at 80° C., for two hours. A further 30 parts of water are added and the treatment continued for a further hour, after which the mass is diluted to a convenient consistency by addition of water, and the mixture rendered faintly acid to litmus by addition of dilute sulphuric acid, then faintly alkaline to litmus by addition of dilute ammonia. The liquor is removed by means of centrifugal machine, and afterwards the wood meal is washed in the machine and the water is separated until the solid has a moisture content of about 62%. The product so obtained is then mixed with a phenol-formaldehyde condensation product in the known manner to give a new moulding composition of improved bulk density.

We claim:

1. The method of preparing a moulding composition of high bulk density and of low moisture content which comprises preparing a filling material by subjecting such material to treatment with a caustic solution, kneading the mixture so prepared for a prolonged period of time at an elevated temperature, removing the caustic solution, materially reducing the moisture content, and mixing the material so prepared with an artificial resin.

2. The method of preparing a moulding composition of high bulk density and of low moisture content which comprises preparing a filling material by subjecting woody material to treatment with a caustic solution, kneading the mixture so prepared for about two hours time at a temperature of about 80° C., removing the caustic solution, reducing the moisture content to about 62% content, and mixing the material so prepared with a phenol-formaldehyde condensation product.

ALFRED RAYMOND STEELE.
ALEXANDER STEWART.